US011449865B2

(12) United States Patent
Feng

(10) Patent No.: US 11,449,865 B2
(45) Date of Patent: Sep. 20, 2022

(54) METHOD AND DEVICE FOR AVOIDING DOUBLE-SPENDING PROBLEM IN READ-WRITE SET-MODEL-BASED BLOCKCHAIN TECHNOLOGY

(71) Applicant: Advanced New Technologies Co., Ltd., Grand Cayman (KY)

(72) Inventor: Zhiyuan Feng, Hangzhou (CN)

(73) Assignee: Advanced New Technologies Co., Ltd., Grand Cayman (KY)

(*) Notice: Subject to any disclaimer, the term of this patent is extended or adjusted under 35 U.S.C. 154(b) by 79 days.

(21) Appl. No.: 16/671,055

(22) Filed: Oct. 31, 2019

(65) Prior Publication Data

US 2020/0349568 A1 Nov. 5, 2020

Related U.S. Application Data

(63) Continuation of application No. PCT/CN2019/085212, filed on Apr. 30, 2019.

(51) Int. Cl.
*G06Q 20/40* (2012.01)
*G06Q 20/06* (2012.01)
(Continued)

(52) U.S. Cl.
CPC ............ *G06Q 20/401* (2013.01); *G06F 9/38* (2013.01); *G06Q 20/065* (2013.01);
(Continued)

(58) Field of Classification Search
CPC ............... G06Q 20/401; G06Q 20/065; G06Q 20/3676; G06Q 20/3678; G06Q 20/3825;
(Continued)

(56) References Cited

U.S. PATENT DOCUMENTS 10,333,694 B1 * 6/2019 Hu .................. H04L 9/3239
2014/0379658 A1 * 12/2014 Cheriton ............ G06F 16/2365
707/639
(Continued)

FOREIGN PATENT DOCUMENTS

CN 108764870 11/2018
CN 108921559 11/2018
(Continued)

OTHER PUBLICATIONS

Crosby et al., "BlockChain Technology: Beyond Bitcoin," Sutardja Center for Entrepreneurship & Technology Technical Report, Oct. 16, 2015, 35 pages.
(Continued)

*Primary Examiner* — John W Hayes
*Assistant Examiner* — Taylor S Rak
(74) *Attorney, Agent, or Firm* — Fish & Richardson P.C.

(57) ABSTRACT

Disclosed herein are methods, systems, and apparatus, including computer programs encoded on computer storage media, for avoiding double-spending problem in read-write set-model-based blockchain technology. One of the methods includes receiving instructions to execute two or more blockchain transactions on a piece of data, where all blockchain transactions of the two or more blockchain transactions modify a value of the piece of data, and for each blockchain transaction from the two or more blockchain transactions, pre-executing a smart contract associated with the blockchain transaction to generate a special instruction indicating the blockchain transaction, where the special instruction is used to validate that a current value of the piece of data supports the blockchain transaction when executing the smart contract to write the blockchain transaction to a blockchain.

12 Claims, 7 Drawing Sheets

(51) Int. Cl.
*G06Q 20/38* (2012.01)
*H04L 9/06* (2006.01)
*H04L 9/32* (2006.01)
*H04L 9/00* (2022.01)
*G06Q 20/36* (2012.01)
*G06F 9/38* (2018.01)

(52) U.S. Cl.
CPC ..... *G06Q 20/3676* (2013.01); *G06Q 20/3678* (2013.01); *G06Q 20/3825* (2013.01); *H04L 9/0637* (2013.01); *H04L 9/3297* (2013.01); *H04L 9/50* (2022.05); *H04L 2209/56* (2013.01)

(58) Field of Classification Search
CPC ....... G06F 9/38; H04L 9/0637; H04L 9/3297; H04L 9/50; H04L 2209/56
See application file for complete search history.

(56) References Cited

U.S. PATENT DOCUMENTS

| | | | |
|---|---|---|---|
| 2016/0358253 A1 | 12/2016 | Liao et al. | |
| 2019/0114182 A1 | 4/2019 | Chalakudi et al. | |
| 2020/0034469 A1* | 1/2020 | Sato | G06F 16/1834 |
| 2020/0052884 A1* | 2/2020 | Tong | H04L 67/104 |
| 2020/0074424 A1* | 3/2020 | Motylinski | G06Q 20/065 |

FOREIGN PATENT DOCUMENTS

| | | |
|---|---|---|
| CN | 109242485 | 1/2019 |
| CN | 109271245 | 1/2019 |
| JP | 2018181309 | 11/2018 |
| KR | 101660627 | 9/2016 |
| KR | 101856038 | 6/2018 |
| KR | 20180113145 | 10/2018 |
| WO | WO 2019072303 | 4/2019 |
| WO | WO 2019072305 | 4/2019 |

OTHER PUBLICATIONS

Nakamoto, "Bitcoin: A Peer-to-Peer Electronic Cash System," www.bitcoin.org, 2005, 9 pages.
Extended European Search Report in European Application No. 19738647.7, dated Jun. 5, 2020, 9 pages.
PCT International Search Report and Written Opinion in International Application No. PCT/CN2019/085212, dated Jan. 23, 2020, 6 pages.
Sharma et al., "How to Databasify a Blockchain: the Case of Hyperledger Fabric", Cornell University, Oct. 31, 2018, 28 pages.
Androulaki et al., "Hyperledger Fabric: A Distributed Operating System for Permissioned Blockchains", 13th EuroSys Conference, Apr. 18, 2018, 15 pages.
PCT International Preliminary Report on Patentability in International Application No. PCT/CN2019/085212, dated Nov. 2, 2021, 4 pages.

* cited by examiner

METHOD AND DEVICE FOR AVOIDING DOUBLE-SPENDING PROBLEM IN READ-WRITE SET-MODEL-BASED BLOCKCHAIN TECHNOLOGY

CROSS-REFERENCE TO RELATED APPLICATIONS

This application is a continuation of PCT Application No. PCT/CN2019/085212, filed on Apr. 30, 2019, which is hereby incorporated by reference in its entirety.

TECHNICAL FIELD

This specification relates to the field of blockchain technology, and in particular, to methods and devices for avoiding double-spending problem in read-write set-model-based blockchain technology.

BACKGROUND

Distributed ledger systems (DLSs), which can also be referred to as consensus networks, and/or blockchain networks, enable participating entities to securely and to immutably conduct transactions and to store data. DLSs are commonly referred to as blockchain networks without referencing any particular user case. Examples of types of blockchain networks can include public blockchain networks, private blockchain networks, and consortium blockchain networks. A consortium blockchain network is provided for a select group of entities, which control a consensus process, and includes an access control layer.

In blockchain networks, due to reproducibility of data, a digital asset could possibly be reused. For example, multiple parallel blockchain transactions can be performed on a same digital asset (referred to as double-spending). In some cases, if the multiple parallel blockchain transactions read on a same data, once the first parallel blockchain transaction modifies the data, other parallel blockchain transactions may fail due to the data modification (referred to as a double-spending problem).

Currently, there are two primary blockchain process types. One is led by Ethereum and achieves consensus first, executes a smart contract next, and modifies a state of a data last. The other is led by Hyperledger Fabric and pre-executes smart contracts for logical verification first, performs consensus sorting for the generated read-write sets next, and performs data verification for each generated read-write set last. Since Ethereum executes transactions sequentially, there can be no double-spending problem. However, Hyperledger Fabric implements a pre-execution smart contract scheme based on a read-write set, and may encounter the double-spending problem.

It would be desirable to provide a solution to the double-spending problem in read-write set-model-based blockchain technology (e.g., Hyperledger Fabric).

SUMMARY

This specification describes technologies for avoiding double-spending problem in blockchain transactions. These technologies generally involve receiving instructions to execute two or more blockchain transactions on a piece of data, where all blockchain transactions of the two or more blockchain transactions modify a value of the piece of data, and for each blockchain transaction from the two or more blockchain transactions, pre-executing a smart contract associated with the blockchain transaction to generate a special instruction indicating the blockchain transaction, where the special instruction is used to validate that a current value of the piece of data supports the blockchain transaction when executing the smart contract to write the blockchain transaction to a blockchain.

This specification also provides one or more non-transitory computer-readable storage media coupled to one or more processors and having instructions stored thereon which, when executed by the one or more processors, cause the one or more processors to perform operations in accordance with embodiments of the methods provided herein.

This specification further provides a system for implementing the methods provided herein. The system includes one or more processors, and a computer-readable storage medium coupled to the one or more processors having instructions stored thereon which, when executed by the one or more processors, cause the one or more processors to perform operations in accordance with embodiments of the methods provided herein.

It is appreciated that methods in accordance with this specification may include any combination of the aspects and features described herein. That is, methods in accordance with this specification are not limited to the combinations of aspects and features specifically described herein, but can also include any combination of the aspects and features provided.

The details of one or more embodiments of this specification are set forth in the accompanying drawings and the description below. Other features and advantages of this specification will be apparent from the description and drawings, and from the claims.

BRIEF DESCRIPTION OF THE DRAWINGS

Like reference numbers and designations in the various drawings indicate like elements.

DETAILED DESCRIPTION

Figure 1:
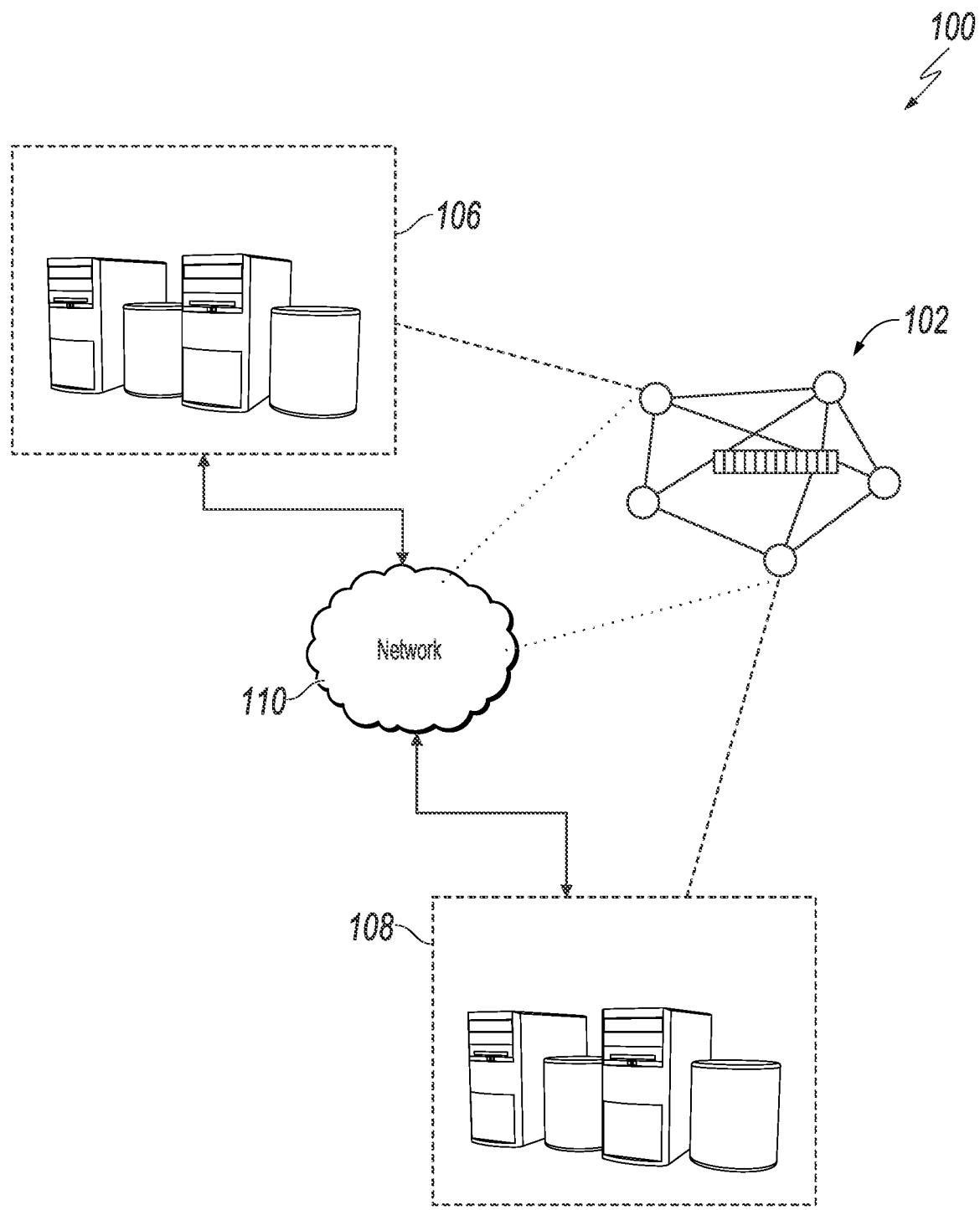
FIG. 1 is a diagram illustrating an example of an environment that can be used to execute embodiments of this specification.

The following detailed description describes avoiding double-spending problem in read-write set-model-based blockchain technology, and is presented to enable any person skilled in the art to make and use the disclosed subject matter in the context of one or more particular embodiments.

Instructions to execute two or more blockchain transactions on a piece of data are received. For each blockchain transaction, a corresponding smart contract is pre-executed to generate a special instruction, instead of a read-write set. The special instruction is used to validate that a current value of the piece of data supports the blockchain transaction when executing the corresponding smart contract to write the blockchain transaction to a blockchain.

Various modifications, alterations, and permutations of the disclosed embodiments can be made and will be readily apparent to those of ordinary skill in the art, and the general principles defined can be applied to other embodiments and applications, without departing from the scope of this specification. In some instances, one or more technical details that are unnecessary to obtain an understanding of the described subject matter and that are within the skill of one of ordinary skill in the art may be omitted so as to not obscure one or more described embodiments. This specification is not intended to be limited to the described or illustrated embodiments, but to be accorded the widest scope consistent with the described principles and features.

To provide further context for embodiments of this specification, and as introduced above, distributed ledger systems (DLSs), which can also be referred to as consensus networks (e.g., made up of peer-to-peer nodes), and blockchain networks, enable participating entities to securely and to immutably conduct transactions and to store data. Although the term blockchain is generally associated with particular networks, and/or use cases, blockchain is used herein to generally refer to a DLS without reference to any particular use case.

A blockchain is a data structure that stores transactions in a way that the transactions are immutable. Thus, transactions recorded on a blockchain are reliable and trustworthy. A blockchain includes one or more blocks. Each block in the chain is linked to a previous block immediately before it in the chain by including a cryptographic hash of the previous block. Each block also includes a timestamp, its own cryptographic hash, and one or more transactions. The transactions, which have already been verified by the nodes of the blockchain network, are hashed and encoded into a Merkle tree. A Merkle tree is a data structure in which data at the leaf nodes of the tree is hashed, and all hashes in each branch of the tree are concatenated at the root of the branch. This process continues up the tree to the root of the entire tree, which stores a hash that is representative of all data in the tree. A hash purporting to be of a transaction stored in the tree can be quickly verified by determining whether it is consistent with the structure of the tree.

Whereas a blockchain is a decentralized or at least partially decentralized data structure for storing transactions, a blockchain network is a network of computing nodes that manage, update, and maintain one or more blockchains by broadcasting, verifying and validating transactions, etc. As introduced above, a blockchain network can be provided as a public blockchain network, a private blockchain network, or a consortium blockchain network. Embodiments of this specification are described in further detail herein with reference to a consortium blockchain network. It is contemplated, however, that embodiments of this specification can be realized in any appropriate type of blockchain network.

In general, a consortium blockchain network is private among the participating entities. In a consortium blockchain network, the consensus process is controlled by an authorized set of nodes, which can be referred to as consensus nodes, one or more consensus nodes being operated by a respective entity (e.g., a financial institution, insurance company). For example, a consortium of ten (10) entities (e.g., financial institutions, insurance companies) can operate a consortium blockchain network, each of which operates at least one node in the consortium blockchain network.

In some examples, within a consortium blockchain network, a global blockchain is provided as a blockchain that is replicated across all nodes. That is, all consensus nodes are in perfect state consensus with respect to the global blockchain. To achieve consensus (e.g., agreement to the addition of a block to a blockchain), a consensus protocol is implemented within the consortium blockchain network. For example, the consortium blockchain network can implement a practical Byzantine fault tolerance (PBFT) consensus, described in further detail below.

FIG. 1 is a diagram illustrating an example of an environment 100 that can be used to execute embodiments of this specification. In some examples, the environment 100 enables entities to participate in a consortium blockchain network 102. The environment 100 includes computing devices 106, 108, and a network 110. In some examples, the network 110 includes a local area network (LAN), wide area network (WAN), the Internet, or a combination thereof, and connects web sites, user devices (e.g., computing devices), and back-end systems. In some examples, the network 110 can be accessed over a wired and/or a wireless communications link. In some examples, the network 110 enables communication with, and within the consortium blockchain network 102. In general the network 110 represents one or more communication networks. In some cases, the computing devices 106, 108 can be nodes of a cloud computing system (not shown), or each computing device 106, 108 can be a separate cloud computing system including a number of computers interconnected by a network and functioning as a distributed processing system.

In the depicted example, the computing systems 106, 108 can each include any appropriate computing system that enables participation as a node in the consortium blockchain network 102. Examples of computing devices include, without limitation, a server, a desktop computer, a laptop computer, a tablet computing device, and a smartphone. In some examples, the computing systems 106, 108 host one or more computer-implemented services for interacting with the consortium blockchain network 102. For example, the computing system 106 can host computer-implemented services of a first entity (e.g., user A), such as a transaction management system that the first entity uses to manage its transactions with one or more other entities (e.g., other users). The computing system 108 can host computer-implemented services of a second entity (e.g., user B), such as a transaction management system that the second entity uses to manage its transactions with one or more other entities (e.g., other users). In the example of FIG. 1, the consortium blockchain network 102 is represented as a peer-to-peer network of nodes, and the computing systems 106, 108 provide nodes of the first entity, and second entity respectively, which participate in the consortium blockchain network 102.

Figure 2:
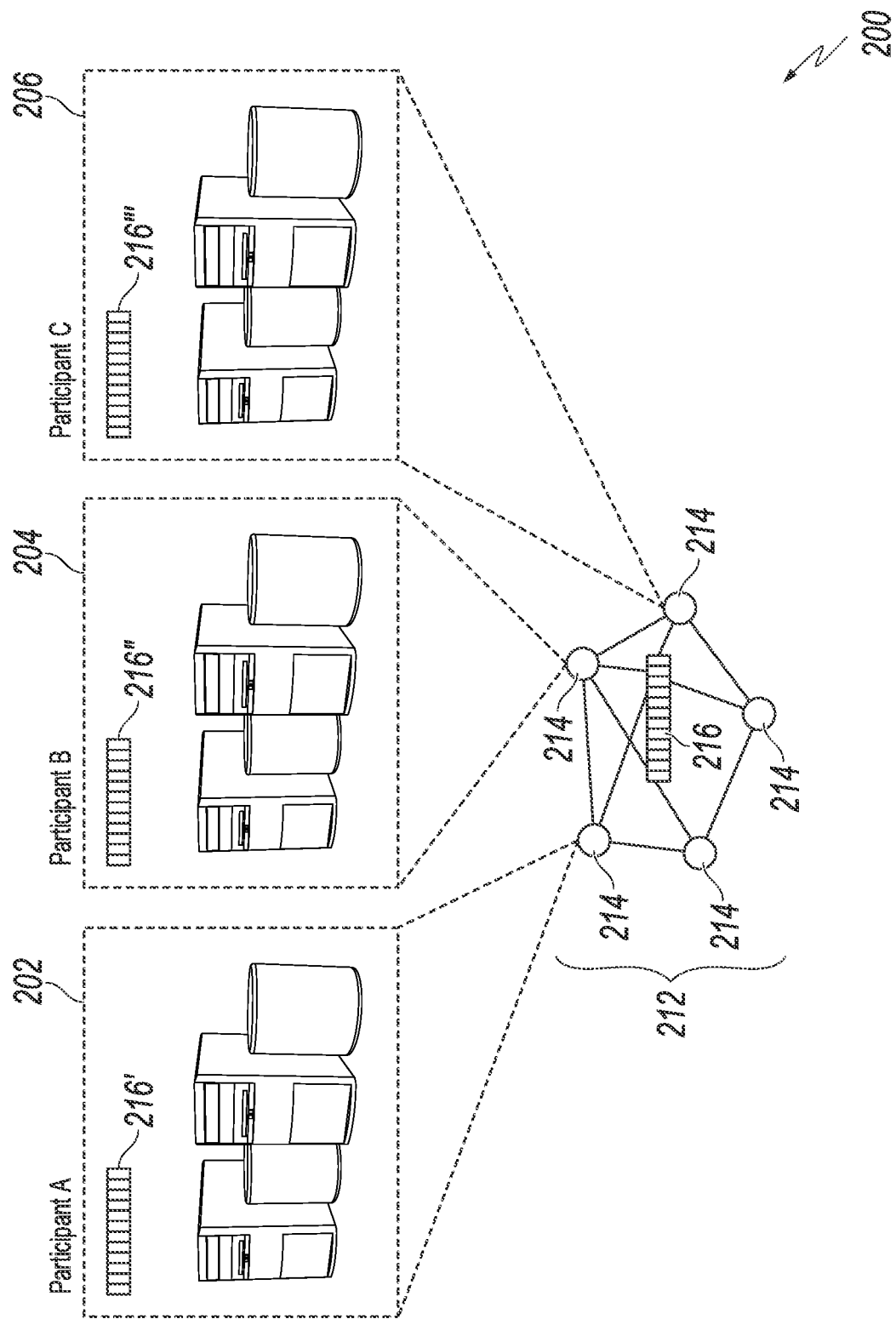
FIG. 2 is a diagram illustrating an example of a conceptual architecture in accordance with embodiments of this specification.

FIG. 2 is a diagram illustrating an example of a conceptual architecture 200 in accordance with embodiments of this specification. The example conceptual architecture 200 includes participant systems 202, 204, 206 that correspond to Participant A, Participant B, Participant C, respectively. Each participant (e.g., user, enterprise) participates in a blockchain network 212 provided as a peer-to-peer network including a plurality of nodes 214, at least some of which immutably record information in a blockchain 216. Although a single blockchain 216 is schematically depicted within the blockchain network 212, multiple copies of the blockchain 216 are provided, and are maintained across the blockchain network 212, as described in further detail herein.

In the depicted example, each participant system 202, 204, 206 is provided by, or on behalf of Participant A, Participant B, Participant C, respectively, and functions as a respective node 214 within the blockchain network. As used herein, a node generally refers to an individual system (e.g., computer, server) that is connected to the blockchain network 212, and enables a respective participant to participate in the blockchain network. In the example of FIG. 2, a participant corresponds to each node 214. It is contemplated, however, that a participant can operate multiple nodes 214 within the blockchain network 212, and/or multiple participants can share a node 214. In some examples, the participant systems 202, 204, 206 communicate with, or through the blockchain network 212 using a protocol (e.g., hypertext transfer protocol secure (HTTPS)), and/or using remote procedure calls (RPCs).

Nodes 214 can have varying degrees of participation within the blockchain network 212. For example, some nodes 214 can participate in the consensus process (e.g., as minder nodes that add blocks to the blockchain 216), while other nodes 214 do not participate in the consensus process. As another example, some nodes 214 store a complete copy of the blockchain 216, while other nodes 214 only store copies of portions of the blockchain 216. For example, data access privileges can limit the blockchain data that a respective participant stores within its respective system. In the example of FIG. 2, the participant systems 202, 204, 206 store respective, complete copies 216', 216'', 216''' of the blockchain 216.

A blockchain (e.g., the blockchain 216 of FIG. 2) is made up of a chain of blocks, each block storing data. Examples of data include transaction data representative of a transaction between two or more participants. While transactions are used herein by way of non-limiting example, it is contemplated that any appropriate data can be stored in a blockchain (e.g., documents, images, videos, audio). Examples of a transaction can include, without limitation, exchanges of something of value (e.g., assets, products, services, currency). The transaction data is immutably stored within the blockchain. That is, the transaction data cannot be changed.

Before storing in a block, the transaction data is hashed. Hashing is a process of transforming the transaction data (provided as string data) into a fixed-length hash value (also provided as string data). It is not possible to un-hash the hash value to obtain the transaction data. Hashing ensures that even a slight change in the transaction data results in a completely different hash value. Further, and as noted above, the hash value is of fixed length. That is, no matter the size of the transaction data the length of the hash value is fixed. Hashing includes processing the transaction data through a hash function to generate the hash value. An example of a hash function includes, without limitation, the secure hash algorithm (SHA)-256, which outputs 256-bit hash values.

Transaction data of multiple transactions are hashed and stored in a block. For example, hash values of two transactions are provided, and are themselves hashed to provide another hash. This process is repeated until, for all transactions to be stored in a block, a single hash value is provided. This hash value is referred to as a Merkle root hash, and is stored in a header of the block. A change in any of the transactions will result in change in its hash value, and ultimately, a change in the Merkle root hash.

Blocks are added to the blockchain through a consensus protocol. Multiple nodes within the blockchain network participate in the consensus protocol, and perform work to have a block added to the blockchain. Such nodes are referred to as consensus nodes. PBFT, introduced above, is used as a non-limiting example of a consensus protocol. The consensus nodes execute the consensus protocol to add transactions to the blockchain, and update the overall state of the blockchain network.

In further detail, the consensus node generates a block header, hashes all of the transactions in the block, and combines the hash value in pairs to generate further hash values until a single hash value is provided for all transactions in the block (the Merkle root hash). This hash is added to the block header. The consensus node also determines the hash value of the most recent block in the blockchain (i.e., the last block added to the blockchain). The consensus node also adds a nonce value, and a timestamp to the block header.

In general, PBFT provides a practical Byzantine state machine replication that tolerates Byzantine faults (e.g., malfunctioning nodes, malicious nodes). This is achieved in PBFT by assuming that faults will occur (e.g., assuming the existence of independent node failures, and/or manipulated messages sent by consensus nodes). In PBFT, the consensus nodes are provided in a sequence that includes a primary consensus node, and backup consensus nodes. The primary consensus node is periodically changed. Transactions are added to the blockchain by all consensus nodes within the blockchain network reaching an agreement as to the world state of the blockchain network. In this process, messages are transmitted between consensus nodes, and each consensus nodes proves that a message is received from a specified peer node, and verifies that the message was not modified during transmission.

In PBFT, the consensus protocol is provided in multiple phases with all consensus nodes beginning in the same state. To begin, a client sends a request to the primary consensus node to invoke a service operation (e.g., execute a transaction within the blockchain network). In response to receiving the request, the primary consensus node multicasts the request to the backup consensus nodes. The backup consensus nodes execute the request, and each sends a reply to the client. The client waits until a threshold number of replies are received. In some examples, the client waits for f+1 replies to be received, where f is the maximum number of faulty consensus nodes that can be tolerated within the blockchain network. The final result is that a sufficient number of consensus nodes come to an agreement on the order of the record that is to be added to the blockchain, and the record is either accepted, or rejected.

In some blockchain networks, cryptography is implemented to maintain privacy of transactions. For example, if two nodes desire to keep a transaction private, such that other nodes in the blockchain network cannot discern details of the transaction, the nodes can encrypt the transaction data. An example of cryptography includes, without limitation, symmetric encryption and asymmetric encryption. Symmetric encryption refers to an encryption process that uses a single key for both encryption (i.e., generating ciphertext from plaintext), and decryption (i.e., generating plaintext from ciphertext). In symmetric encryption, the same key is available to multiple nodes, so that each node can en-/decrypt transaction data.

Asymmetric encryption uses keys pairs, where each key pair includes a private key and a public key. The private key is known only to a particular node, and the public key is known to any or all other nodes in the blockchain network. A node can use the public key of another node to encrypt data, and the encrypted data can be decrypted using another node's private key. For example, and referring again to FIG. 2, Participant A can use Participant B's public key to encrypt data, and to send the encrypted data to Participant B. Participant B can use its private key to decrypt the encrypted data (e.g., ciphertext) and to extract the original data (e.g., plaintext). Messages encrypted with a node's public key can only be decrypted using the node's private key.

Asymmetric encryption is used to provide digital signatures, which enables participants in a transaction to confirm other participants in the transaction, as well as the validity of the transaction. For example, a node can digitally sign a message, and another node can confirm that the message was sent by the node based on the digital signature of Participant A. Digital signatures can also be used to ensure that messages are not tampered with in transit. For example, and again referencing FIG. 2, Participant A is to send a message to Participant B. Participant A generates a hash of the message, and then, using its private key, encrypts the hash to provide a digital signature as the encrypted hash. Participant A appends the digital signature to the message, and sends the message with digital signature to Participant B. Participant B decrypts the digital signature using the public key of Participant A, and extracts the hash. Participant B hashes the message and compares the hashes. If the hashes are same, Participant B can confirm that the message was indeed from Participant A, and was not tampered with.

Figure 3:
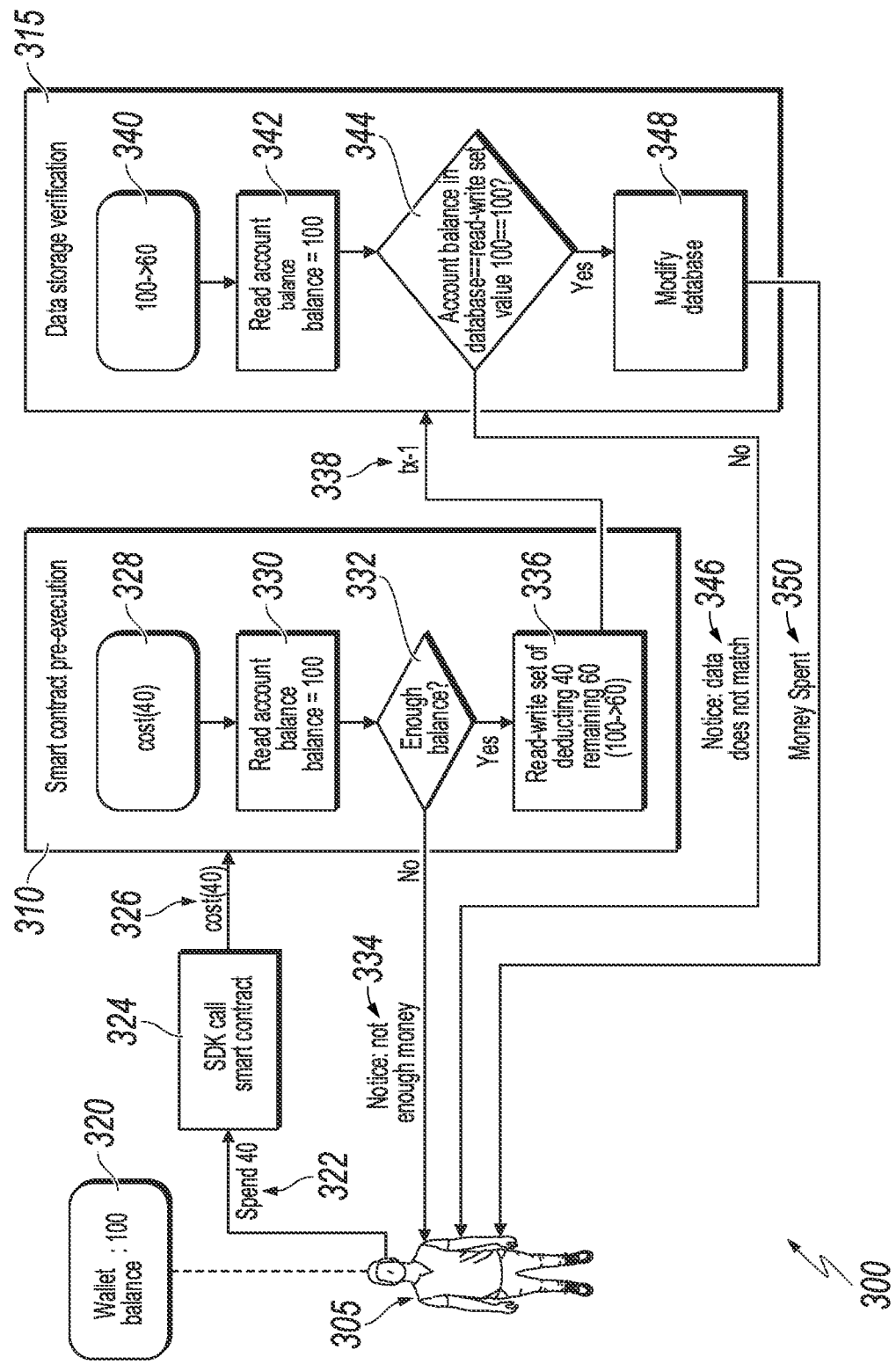
FIG. 3 is a block diagram illustrating an example of a blockchain transaction execution scenario in accordance with embodiments of this specification.

FIG. 3 is a block diagram illustrating an example of a blockchain transaction execution scenario 300 in accordance with embodiments of this specification. The blockchain transaction execution scenario 300 includes a blockchain transaction where a user 305 intends to spend 40 yuan (¥ 40). The blockchain transaction includes a smart contract pre-execution phase 310 and a data storage verification phase 315. For convenience, the blockchain transaction execution scenario 300 will be described as being performed by a system of one or more computers, located in one or more locations, and programmed appropriately in accordance with this specification (e.g., the computing system 106 and/or 108 of FIG. 1 or the participant system 202, 204, and/or 206 of FIG. 2).

As illustrated in FIG. 3, the user 305 has a digital wallet 320 with a wallet balance of 100 yuan. The user 305 intends to spend 40 yuan 322. Through, for example, a software development kit (SDK) call 324 for a smart contract, a blockchain transaction 326 to spend 40 yuan is submitted for execution. To execute the blockchain transaction 326, the smart contract is first pre-executed to perform logical verification on the blockchain transaction 326 to generate a read-write set. After consensus sorting, data verification on the blockchain transaction 326 is performed based on the read-write set to determine whether the blockchain transaction 326 can be executed successfully.

During the smart contract pre-execution phase 310, at 328, a blockchain transaction for spending 40 yuan is received. From 328, the flow proceeds to 330.

At 330, the user's account balance is read (i.e., balance=100). During the smart contract pre-execution phase 310, the user's account balance is not modified (i.e., the balance remains at 100 yuan). From 330, the flow proceeds to 332.

At 332, a determination is made as to whether there is enough (i.e., a sufficient) balance in the user's account for the blockchain transaction to spend 40 yuan. If it is determined that there is not enough balance in the user's account for the blockchain transaction to spend 40 yuan, then the flow proceeds to 334, where a notice indicating not enough money is sent to the user 305. In other words, in the situation with not enough balance, the smart contract pre-execution phase 310 fails, and the blockchain transaction to spend 40 yuan fails. Otherwise, if it is determined that there is enough balance in the user's account for the blockchain transaction to spend 40 yuan, then the flow proceeds to 336, where a read-write set is generated. For example, a read-write set of (100→60) is generated. The read-write set of (100→60) indicates deducting 40 yuan from the user's account with a balance of 100 yuan, and the user's account with a remaining balance of 60 yuan after the blockchain transaction to spend 40 yuan succeeds (e.g., the user's account balance changing from 100 yuan to 60 yuan). After 336, the blockchain transaction with the generated read-write set is submitted 338 for consensus sorting before finalized in the data storage verification phase 315.

During the data storage verification phase 315, at 340, a blockchain transaction with a read-write set of (100→60) is received. From 340, the flow proceeds to 342.

At 342, the user's account balance is read (i.e., balance=100). From 342, the flow proceeds to 344.

At 344, a determination is made as to whether the user's account balance equals to the account balance indicated in the read-write set of (100→60) (i.e., read-write set account balance=100). If it is determined that the user's account balance does not equal to the account balance indicated in the read-write set of (100→60), then the flow proceeds to 346, where a message indicating that data does not match is sent to notify the user 305. In other words, the data storage verification phase 315 fails, and as a result the blockchain transaction to spend 40 yuan fails. Otherwise, if it is determined that the user's account balance equals to the account balance indicated in the read-write set of (100→60), then the flow proceeds to 348, where a database is modified according to the read-write set of (100→60) (e.g., the user's account balance being modified from 100 yuan to 60 yuan). For example, the blockchain transaction to spend 40 yuan is stored in a data block of a blockchain. From 348, the flow proceeds to 350, where a message indicating money spent is sent to notify the user 305. In other words, the blockchain transaction to spend 40 yuan succeeds.

The blockchain transaction execution scenario 300 illustrated in FIG. 3 uses a read-write set-model-based blockchain technology (e.g., Hyperledger Fabric). Unlike traditional smart contract calling logic (such as, Ethereum), the read-write set-model-based blockchain technology separates logical verification and data verification. An execution during the smart contract pre-execution phase 310 (e.g., logical verification) does not modify data, and can obtain endorsement of one or more nodes in a blockchain network. A transaction after consensus sorting and during the data storage verification phase 315 (e.g., data verification) can modify the data. In doing so, the performance of the blockchain technology can be improved.

Figure 4:
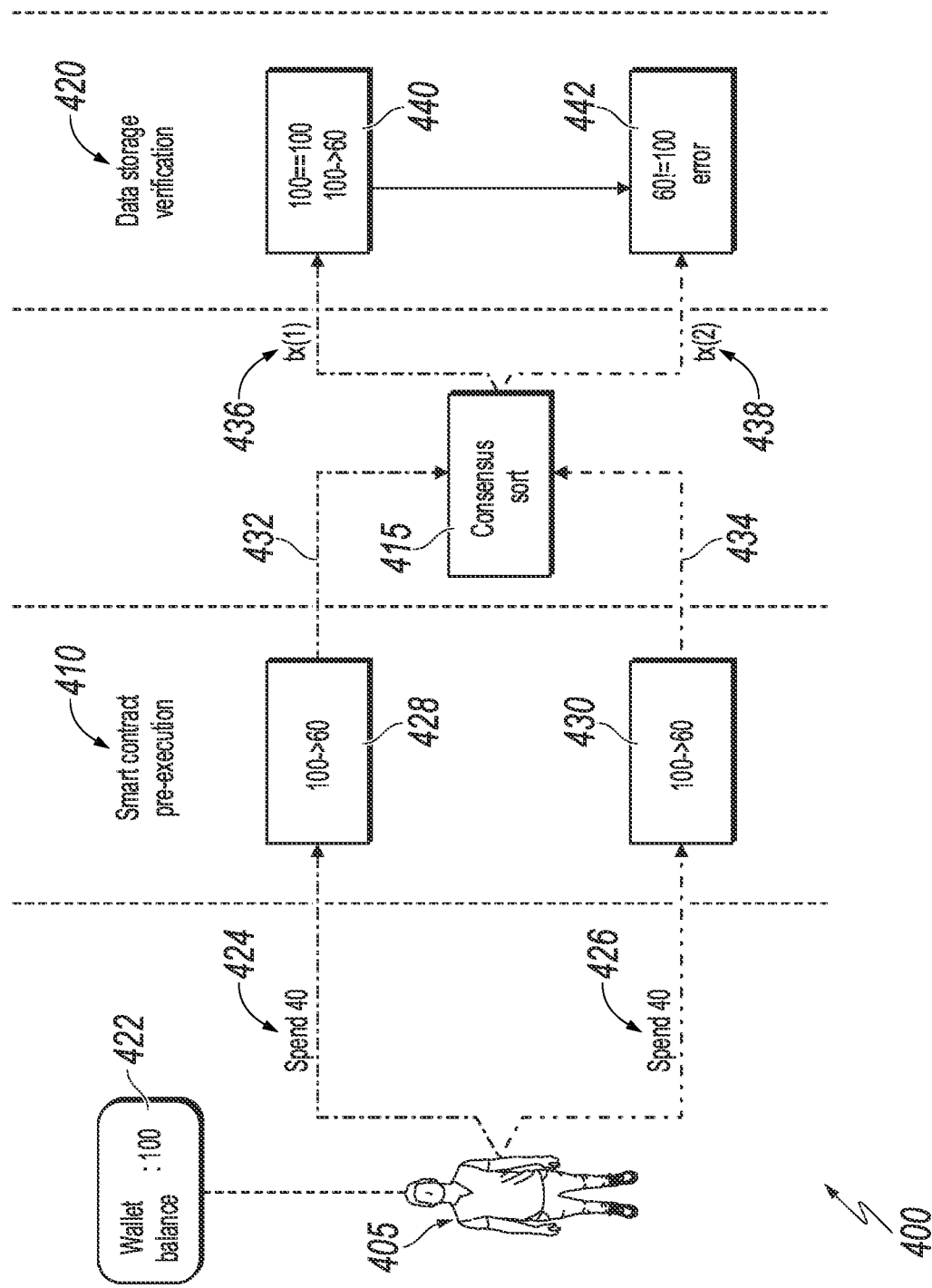
FIG. 4 is a block diagram illustrating an example of a conventional execution scenario for two parallel blockchain transactions in accordance with embodiments of this specification.

FIG. 4 is a block diagram illustrating an example of a conventional execution scenario 400 for two parallel blockchain transactions in accordance with embodiments of this specification. The conventional execution scenario 400 includes two parallel blockchain transactions that a user 405 intended to spend 40 yuan (¥ 40) in each blockchain transaction of the two parallel blockchain transactions. Each blockchain transaction includes a smart contract pre-execution phase 410, a consensus sorting phase 415, and a data storage verification phase 420. In some embodiments, the conventional execution scenario 400 can include more than two parallel blockchain transactions. For convenience, the conventional execution scenario 400 will be described as being performed by a system of one or more computers, located in one or more locations, and programmed appropriately in accordance with this specification. (e.g., the computing system 106 and/or 108 of FIG. 1 or the participant system 202, 204, and/or 206 of FIG. 2).

As illustrated in FIG. 4, the user 405 has a digital wallet 422 with a wallet balance of 100 yuan. The user 405 intended to spend a total of 80 yuan in two parallel blockchain transactions 424 and 426. Each blockchain transaction is to spend 40 yuan. In some embodiments, different amount can be spent on each blockchain transaction. To execute the two parallel blockchain transactions 424 and 426, a smart contract is first pre-executed to perform logical verification on each blockchain transaction to generate a corresponding read-write set. After consensus sorting, data verification on each blockchain transaction is performed based on the corresponding read-write set to determine whether each blockchain transaction can be executed successfully.

During the smart contract pre-execution phase 410 (similar to the smart contract pre-execution phase 310 in FIG. 3), a read-write set 428 (i.e., (100→60)) is generated for the blockchain transaction 424. The read-write set 428 indicates deducting 40 yuan from the user's account with a balance of 100 yuan, and the user's account with a remaining balance of 60 yuan after the blockchain transaction 424 succeeds (e.g., the user's account balance changing from 100 yuan to 60 yuan). In addition, a read-write set 430 (i.e., (100→60)) is generated for the blockchain transaction 426.

If the user's account has no other consumption, the two parallel blockchain transactions 424 and 426 read the same user's account balance stored in a database during the smart contract pre-execution phase 410. Therefore, the read-write set 430 also indicates deducting 40 yuan from the user's account with a balance of 100 yuan, and the user's account with a remaining balance of 60 yuan after the blockchain transaction 430 succeeds (e.g., the user's account balance changing from 100 yuan to 60 yuan).

After the smart contract pre-execution phase 410, the blockchain transaction with the read-write set 428 is submitted 432 for consensus sorting, and the blockchain transaction with the read-write set 430 is also submitted 434 for consensus sorting.

During the consensus sorting phase 415, assume, for convenience, that the blockchain transaction with the read-write set 428 is put as a first transaction 436 to be executed in the data storage verification phase 420, and the blockchain transaction with the read-write set 430 is put as a second transaction 438 to be executed in the data storage verification phase 420.

During the data storage verification phase 420 (similar to the data storage verification phase 315 in FIG. 3), the blockchain transaction with the read-write set 428 is executed first 440. At 440, the user's account balance is read (i.e., balance=100). A determination is made that the user's account balance equals to the account balance indicated in the read-write set 428 (i.e., 100==100). A database is modified according to the read-write set 428 (e.g., the user's account balance being modified from 100 yuan to 60 yuan). In other words, the data storage verification phase 420 for the blockchain transaction with the read-write set 428 succeeds, and as a result the blockchain transaction 424 succeeds. After the blockchain transaction with the read-write set 428 succeeds, the flow proceeds to 442, where the blockchain transaction with the read-write set 430 is executed. At 442, the user's account balance is read (i.e., balance=60). A determination is made that the user's account balance does not equal to the account balance indicated in the read-write set 430 (i.e., 60!=100). In other words, the data storage verification phase 420 for the blockchain transaction with the read-write set 430 fails, and as a result the blockchain transaction 426 fails.

As illustrated in FIG. 4, when two or more parallel blockchain transactions are executed on a piece of data (such as, an account balance), the same data is read for each blockchain transaction during logical verification (e.g., the smart contract pre-execution phase 410). After consensus sorting and during data verification (e.g., the data storage verification phase 420), a blockchain transaction, executed first among the two or more parallel blockchain transactions (e.g., the blockchain transaction 424), succeeds in data verification, and modifies the piece of data. As a result, subsequent blockchain transactions, executed after the first executed blockchain transaction, will fail in data verification. In other words, even there is enough balance supporting a subsequent blockchain transaction (e.g., the blockchain transaction 426), the subsequent blockchain transaction will fail in data verification since the piece of data has been modified by the first executed blockchain transaction. For example, all parallel blockchain transactions, except the first executed blockchain transaction, fails. Therefore, performance of the conventional execution scenario 400 is inefficient and consumes more resource when concurrent transactions are frequent on the piece of data.

Figure 5:
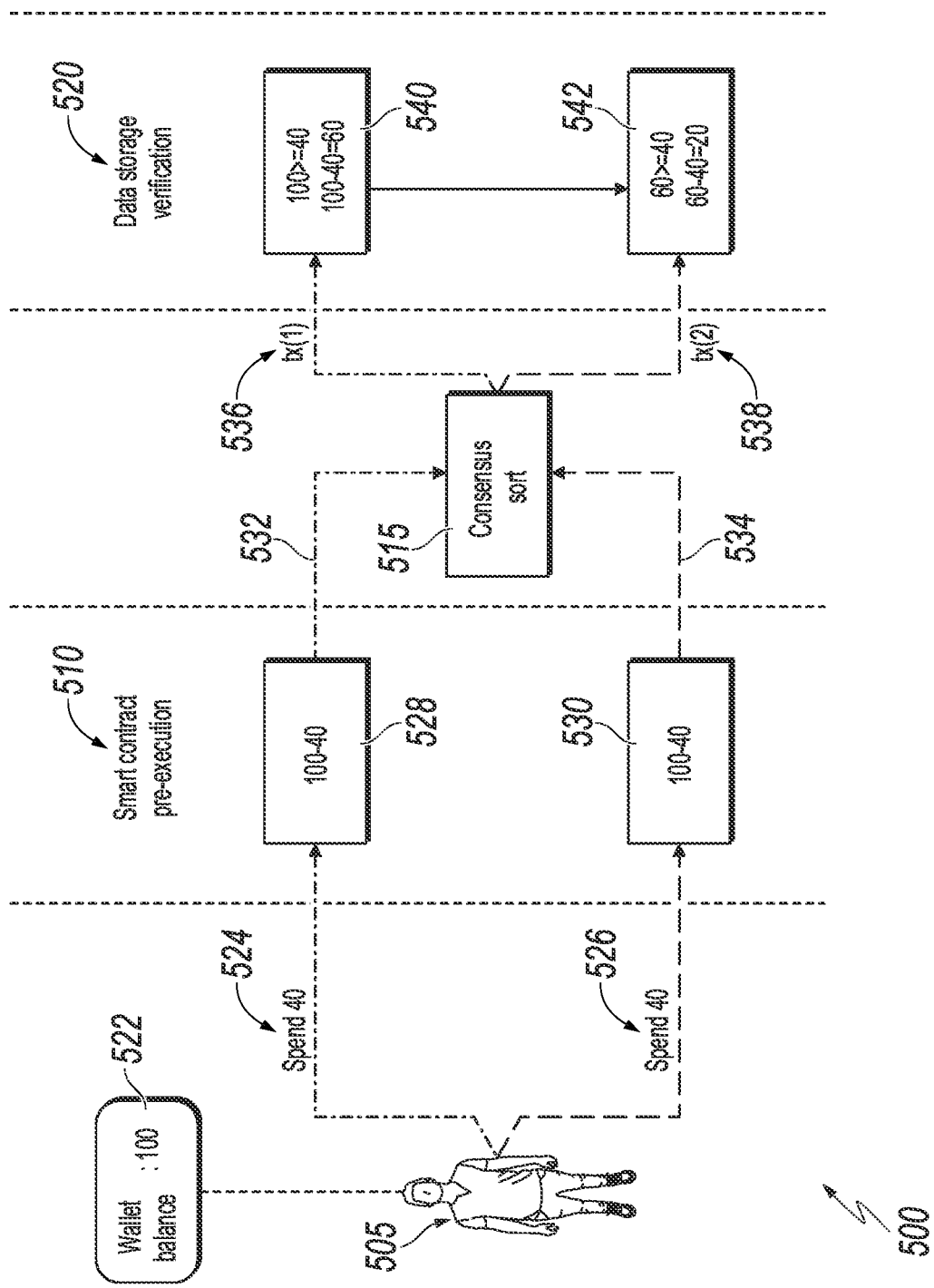
FIG. 5 is a block diagram illustrating an example of an execution scenario for two parallel blockchain transactions in accordance with embodiments of this specification.

FIG. 5 is a block diagram illustrating an example of an execution scenario 500 for two parallel blockchain transactions in accordance with embodiments of this specification. The execution scenario 500 includes two parallel blockchain transactions that a user 505 intended to spend 40 yuan (¥40) in each blockchain transaction of the two parallel blockchain transactions. Each blockchain transaction includes a smart contract pre-execution phase 510, a consensus sorting phase 515, and a data storage verification phase 520. In some embodiments, the execution scenario 500 can include more than two parallel blockchain transactions. For convenience, the execution scenario 500 will be described as being performed by a system of one or more computers, located in one or more locations, and programmed appropriately in accordance with this specification. For example, a computing system (e.g., the computing system 106 and/or 108 of FIG. 1, the participant system 202, 204, and/or 206 of FIG. 2), appropriately programmed, can perform the execution scenario 500.

As illustrated in FIG. 5, the user 505 has a digital wallet 522 with a wallet balance of 100 yuan. The user 505 intended to spend a total of 80 yuan in two parallel blockchain transactions 524 and 526. Each blockchain transaction is to spend 40 yuan. In some embodiments, different amount can be spent on each blockchain transaction. To execute the two parallel blockchain transactions 524 and 526, a smart contract is first pre-executed to perform logical verification on each blockchain transaction to generate a corresponding read-write set. After consensus sorting, data verification on each blockchain transaction is performed based on the corresponding read-write set to determine whether each blockchain transaction can be executed successfully.

During the smart contract pre-execution phase 510, a special instruction 528 (e.g., (100-40)), instead of the read-write set 428 in FIG. 4, is generated for the blockchain transaction 524. The special instruction 528 indicates deducting 40 yuan from the user's account. In some embodiments, the special instruction 528 is used for a determination of a balance change in a smart contract. In addition, a special instruction 530 (e.g., (100-40)), instead of the read-write set 430 in FIG. 4, is generated for the blockchain transaction 526. The special instruction 530 also indicates deducting 40 yuan from the user's account.

After the smart contract pre-execution phase 510, the blockchain transaction with the special instruction 528 is submitted 532 for consensus sorting, and the blockchain transaction with the special instruction 530 is also submitted 534 for consensus sorting.

During the consensus sorting phase 515, assume, for convenience, that the blockchain transaction with the special instruction 528 is put as a first transaction 536 to be executed in the data storage verification phase 520, and the blockchain transaction with the special instruction 530 is put as a second transaction 538 to be executed in the data storage verification phase 520.

During the data storage verification phase 520, the blockchain transaction with the special instruction 528 is executed first 540. At 540, the user's account balance is read (i.e., balance=100). A determination is made as to whether the user's account balance is greater than or equals to a spending amount indicated in the special instruction 528 (i.e., 40). In this case, it is determined that the user's account balance is greater than or equals to the spending amount indicated in the special instruction 528 (i.e., 100>=40). Then, a database is modified according to the special instruction 528 (e.g., 40 yuan being deducted from the user's account). In other words, the data storage verification phase 520 for the blockchain transaction with the special instruction 528 succeeds, and as a result the blockchain transaction 524 succeeds. After the blockchain transaction with the special instruction 528 succeeds, the flow proceeds to 542, where the blockchain transaction with the special instruction 530 is executed. At 542, the user's account balance is read (i.e., balance=60). A determination is made as to whether the user's account balance is greater than or equals to a spending amount indicated in the special instruction 530 (i.e., 40). In this case, it is determined that the user's account balance is greater than or equals to the spending amount indicated in the special instruction 530 (i.e., 60>=40). Then, a database is modified according to the special instruction 530 (e.g., 40 yuan being deducted from the user's account). In other words, the data storage verification phase 520 for the blockchain transaction with the special instruction 530 succeeds, and as a result the blockchain transaction 526 succeeds.

Unlike the conventional execution scenario 400 in FIG. 4, the execution scenario 500 in FIG. 5 generates a special instruction during logical verification (e.g., the smart contract pre-execution phase 510). Instead of verifying, for example, account balance, the special instruction can be used to validate that the account balance supports a corresponding blockchain transaction during data verification. As a result, all parallel blockchain transactions can execute successfully if there is enough balance. In some embodiments, the execution scenario 500 can be used as an extension to the existing read-write set-model-based blockchain technology (e.g., the conventional execution scenario 400 in FIG. 4) to deal with multiple parallel blockchain transactions on a piece of data. For example, the special instruction based blockchain technology (e.g., the execution scenario 500) can be used for accounts with frequent concurrent transactions, and a read-write set-model-based blockchain technology can be used for accounts with less or no concurrent transactions. In some embodiments, a simple logic command can be embedded into a special instruction. The special instruction can then be used to execute a corresponding logic verification during a data storage verification phase to determine whether a corresponding data transaction can be executed successfully.

Advantages can include one or more of the following. First, double-spending problem caused by concurrent reductions from an account can be solved. Multiple parallel blockchain transactions on the account can be executed successfully as long as there is enough balance in the account (e.g., logically reasonable according to special instructions). Second, special instructions are introduced as an extension to the existing read-write set-model-based blockchain technology. In smart contracts, logic to determine balance change is invoked by a special instruction. When a node performs a data status check, the special instruction is used to check a balance to determine validity of the data status. Third, the special instruction scheme is applicable to all kinds of situations where a single policy modification is applied to a piece of data in read-write set-model-based blockchain technology. The piece of data can have a data type including at least one of a numeric type, a state type, and a data type.

Figure 6:
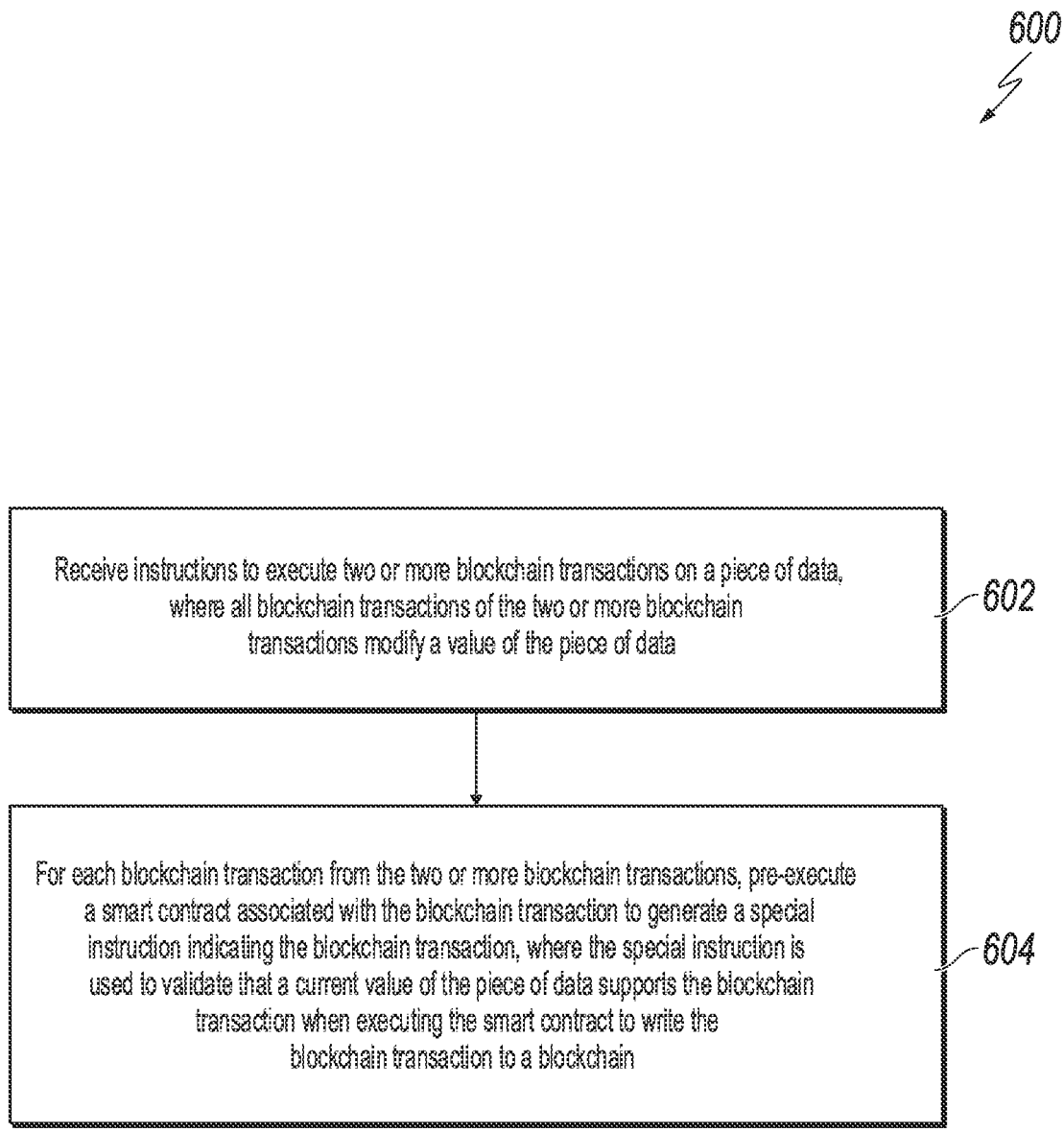
FIG. 6 is a flowchart illustrating an example of a method for avoiding double-spending problem in blockchain transactions in accordance with embodiments of this specification.

FIG. 6 is a flowchart illustrating an example of a method 600 for avoiding double-spending problem in blockchain transactions in accordance with embodiments of this specification. For convenience, the method 600 will be described as being performed by a system of one or more computers, located in one or more locations, and programmed appropriately in accordance with this specification. For example, a computing system (e.g., the computing system 106 and/or 108 of FIG. 1, the participant system 202, 204, and/or 206 of FIG. 2), appropriately programmed, can perform the method 600.

At 602, instructions are received to execute two or more blockchain transactions on a piece of data. All blockchain transactions of the two or more blockchain transactions modify (e.g., add to, subtract from) a value of the piece of data. In some embodiments, the piece of data can be data that is used (e.g., modified) in a blockchain process. For example, the piece of data can be a user account that a user can spend money from or deposit money to. In some embodiments, the piece of data can have a data type including at least one of a numeric type, a state type, and a data type. In some embodiments, the two or more blockchain transactions are double-spending transactions and executed in parallel on the piece of data. In some embodiments, the blockchain is based on a read-write set model.

At 604, for each blockchain transaction from the two or more blockchain transactions, a smart contract associated with the blockchain transaction is pre-executed to generate a special instruction indicating the blockchain transaction. The special instruction is used to validate that a current value of the piece of data supports the blockchain transaction when executing the smart contract to write the blockchain transaction to a blockchain. In some embodiments, the special instruction, instead of a read-write set, is generated when pre-executing the smart contract associated with the blockchain transaction. In other words, a read-write set is not generated when pre-executing the smart contract associated with the blockchain transaction. For example, when executing a blockchain transaction to spend 40 yuan from an account with a balance of 100 yuan, a special instruction (100-40) (such as, 528 and/or 530 of FIG. 5) is generated and a read-write set (100→60) (such as, 428 and/or 430 of FIG. 4) is not generated.

In some embodiments, the blockchain transaction is to deduct an amount from the piece of data. In such cases, validating that the current value of the piece of data supports the blockchain transaction comprises validating that the current value of the piece of data is greater than or equal to the amount. In some embodiments, the blockchain transaction is to deposit an amount to the piece of data. In such cases, validating that the current value of the piece of data supports the blockchain transaction may not be performed. For example, the smart contract can be executed to write the blockchain transaction to a blockchain without validating the current value of the piece of data. In some embodiments, for each blockchain transaction, pre-executing the smart contract associated with the blockchain transaction to generate the special instruction indicating the blockchain transaction comprises performing a balance check on the piece of data, and if the balance check on the piece of data supports the blockchain transaction, generating the special instruction indicating the blockchain transaction. In some embodiments, the special instruction indicates a comparison operation to be performed on the piece of data. For example, the comparison operation compares a current value of the piece of data with an amount to be deducted from the piece of data.

The method 600 shown in FIG. 6 can be modified or reconfigured to include additional, fewer, or different actions (not shown in FIG. 6), which can be performed in the order shown or in a different order. For example, after 604, the blockchain transaction is submitted for consensus sorting. In response to validating that the current value of the piece of data is greater than or equal to the amount, the smart contract associated with the blockchain transaction is executed to write the blockchain transaction to the blockchain. In some embodiments, validating that the current value of the piece of data is greater than or equal to the amount does not comprise validating that the current value of the piece of data is the same as a value of the piece of data indicated by the special instruction indicating the blockchain transaction. In some embodiments, executing the smart contract associated with the blockchain transaction to write the blockchain transaction to the blockchain comprises generating a data block associated with the blockchain transaction and publishing the data block to the blockchain. In some embodiments, one or more of the actions shown in FIG. 6 can be repeated or iterated, for example, until a terminating condition is reached. In some embodiments, one or more of the individual actions shown in FIG. 6 can be executed as multiple separate actions, or one or more subsets of the actions shown in FIG. 6 can be combined and executed as a single action. In some embodiments, one or more of the individual actions shown in FIG. 6 may also be omitted from the method 600.

Figure 7:
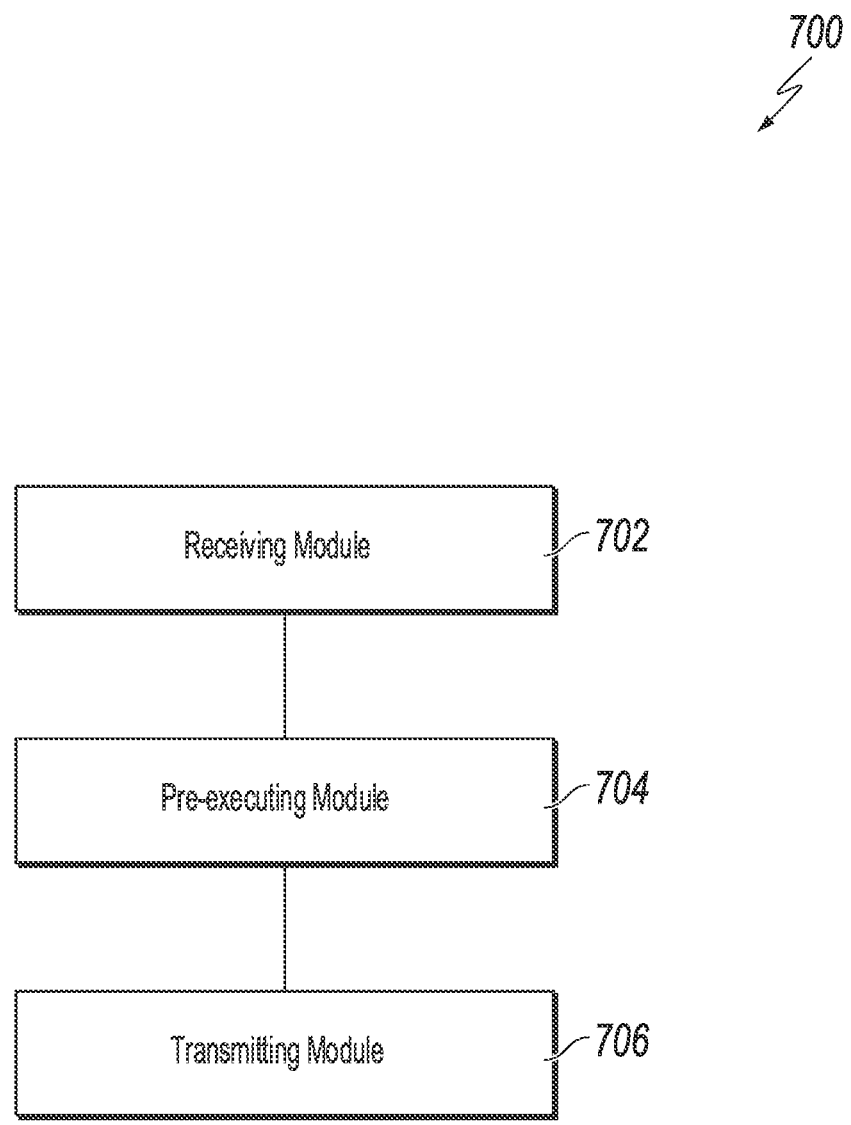
FIG. 7 depicts examples of modules of an apparatus in accordance with embodiments of this specification.

FIG. 7 depicts examples of modules of an apparatus 700 in accordance with embodiments of this specification.

The apparatus 700 can be an example of an embodiment of a blockchain node configured to avoid double-spending problem in a blockchain network, wherein the blockchain network is a consortium blockchain network. The apparatus 700 can correspond to the embodiments described above, and the apparatus 700 includes the following: a receiving module 702 that receives instructions to execute two or more blockchain transactions on a piece of data; a pre-executing module 704 that pre-executes a smart contract associated with a blockchain transaction of the two or more blockchain transactions to generate a special instruction indicating the blockchain transaction; and a transmitting module 706 that transmits the blockchain transaction for consensus sorting.

In an optional embodiment, all blockchain transactions of the two or more blockchain transactions modify a value of the piece of data, and the special instruction is used to validate that a current value of the piece of data supports the blockchain transaction when executing the smart contract to write the blockchain transaction to a blockchain.

In an optional embodiment, the two or more blockchain transactions are executed in parallel on the piece of data.

In an optional embodiment, the blockchain is based on a read-write set model.

In an optional embodiment, for each blockchain transaction, the special instruction, instead of a read-write set, is generated when pre-executing the smart contract associated with the blockchain transaction.

In an optional embodiment, the apparatus 700 further includes a determining module for determining whether a current value of the piece of data is greater than or equal to an amount, to be deducted by the blockchain transaction and from the piece of data, for executing the smart contract to write the blockchain transaction to the blockchain.

In an optional embodiment, validating that the current value of the piece of data supports the blockchain transaction does not comprise validating that the current value of the piece of data is the same as a value of the piece of data indicated by the special instruction indicating the blockchain transaction.

In an optional embodiment, the apparatus 700 further includes a generating module for generating a data block associated with the blockchain transaction, and a publishing module for publishing the data block to the blockchain.

In an optional embodiment, the apparatus 700 further includes a balance checking module for performing a balance check on the piece of data, and a generating module for generating the special instruction indicating the blockchain transaction if the balance check on the piece of data supports the blockchain transaction.

The system, apparatus, module, or unit illustrated in the previous embodiments can be implemented by using a computer chip or an entity, or can be implemented by using a product having a certain function. A typical embodiment device is a computer, and the computer can be a personal computer, a laptop computer, a cellular phone, a camera phone, a smartphone, a personal digital assistant, a media player, a navigation device, an email receiving and sending device, a game console, a tablet computer, a wearable device, or any combination of these devices.

For an embodiment process of functions and roles of each module in the apparatus, references can be made to an embodiment process of corresponding steps in the previous method. Details are omitted here for simplicity.

Because an apparatus embodiment basically corresponds to a method embodiment, for related parts, references can be made to related descriptions in the method embodiment. The previously described apparatus embodiment is merely an example. The modules described as separate parts may or may not be physically separate, and parts displayed as modules may or may not be physical modules, may be located in one position, or may be distributed on a number of network modules. Some or all of the modules can be selected based on actual demands to achieve the objectives of the solutions of the specification. A person of ordinary skill in the art can understand and implement the embodiments of the present specification without creative efforts.

Referring again to FIG. 7, it can be interpreted as illustrating an internal functional module and a structure of a blockchain data pre-execution apparatus. The blockchain data pre-execution apparatus can be an example of a blockchain node configured to avoid double-spending problem in a blockchain network. An execution body in essence can be an electronic device, and the electronic device includes the following: one or more processors; and a memory configured to store an executable instruction of the one or more processors.

The techniques described in this specification can produce one or more technical effects. In some embodiments, a special instruction is introduced as an extension to the existing read-write set-model-based blockchain technology to deal with double-spending issue (such as, executing multiple parallel blockchain transactions on a piece of data). In other embodiments, when executing multiple parallel blockchain transactions on a piece of data, a special instruction, instead of a read-write set, is generated for each blockchain transaction. In still other embodiments, a special instruction is used to validate that a current value of a piece of data supports a corresponding blockchain transaction when executing a smart contract to write the corresponding blockchain transaction to a blockchain.

Described embodiments of the subject matter can include one or more features, alone or in combination.

For example, in a first embodiment, a computer-implemented method for avoiding double-spending problem in blockchain transactions, comprising: receiving instructions to execute two or more blockchain transactions on a piece of data, wherein all blockchain transactions of the two or more blockchain transactions modify a value of the piece of data; and for each blockchain transaction from the two or more blockchain transactions: pre-executing a smart contract associated with the blockchain transaction to generate a special instruction indicating the blockchain transaction, wherein the special instruction is used to validate that a current value of the piece of data supports the blockchain transaction when executing the smart contract to write the blockchain transaction to a blockchain. The foregoing and other described embodiments can each, optionally, include one or more of the following features:

A first feature, combinable with any of the following features, specifies that the two or more blockchain transactions are executed in parallel on the piece of data.

A second feature, combinable with any of the previous or following features, specifies that the blockchain is based on a read-write set model.

A third feature, combinable with any of the previous or following features, specifies that for each blockchain transaction from the two or more blockchain transactions, the special instruction, instead of a read-write set, is generated when pre-executing the smart contract associated with the blockchain transaction.

A fourth feature, combinable with any of the previous or following features, specifies that the blockchain transaction from the two or more blockchain transactions deducts an amount from the piece of data, and wherein validating that the current value of the piece of data supports the blockchain transaction comprises validating that the current value of the piece of data is greater than or equal to the amount.

A fifth feature, combinable with any of the previous or following features, the method further comprises: submitting the blockchain transaction for consensus sorting; and in response to validating that the current value of the piece of data is greater than or equal to the amount, executing the smart contract associated with the blockchain transaction to write the blockchain transaction to the blockchain.

A sixth feature, combinable with any of the previous or following features, specifies that validating that the current value of the piece of data is greater than or equal to the amount does not comprise validating that the current value of the piece of data is the same as a value of the piece of data indicated by the special instruction indicating the blockchain transaction.

A seventh feature, combinable with any of the previous or following features, specifies that executing the smart contract associated with the blockchain transaction to write the blockchain transaction to the blockchain comprises: generating a data block associated with the blockchain transaction; and publishing the data block to the blockchain.

An eighth feature, combinable with any of the previous or following features, specifies that for each blockchain transaction from the two or more blockchain transactions, pre-executing the smart contract associated with the blockchain transaction to generate the special instruction indicating the blockchain transaction comprises: performing a balance check on the piece of data; and if the balance check on the piece of data supports the blockchain transaction, generating the special instruction indicating the blockchain transaction.

A ninth feature, combinable with any of the previous or following features, specifies that the special instruction indicates that a comparison operation is to be performed on the piece of data when executing the smart contract.

In a second embodiment, a system for avoiding double-spending problem in blockchain transactions, comprising: one or more processors; and one or more computer-readable memories coupled to the one or more processors and having instructions stored thereon which are executable by the one or more processors to perform operations comprising: receiving instructions to execute two or more blockchain transactions on a piece of data, wherein all blockchain transactions of the two or more blockchain transactions modify a value of the piece of data; and for each blockchain transaction from the two or more blockchain transactions: pre-executing a smart contract associated with the blockchain transaction to generate a special instruction indicating the blockchain transaction, wherein the special instruction is used to validate that a current value of the piece of data supports the blockchain transaction when executing the smart contract to write the blockchain transaction to a blockchain. The foregoing and other described embodiments can each, optionally, include one or more of the following features:

A first feature, combinable with any of the following features, specifies that the two or more blockchain transactions are executed in parallel on the piece of data.

A second feature, combinable with any of the previous or following features, specifies that the blockchain is based on a read-write set model.

A third feature, combinable with any of the previous or following features, specifies that for each blockchain transaction from the two or more blockchain transactions, the special instruction, instead of a read-write set, is generated when pre-executing the smart contract associated with the blockchain transaction.

A fourth feature, combinable with any of the previous or following features, specifies that the blockchain transaction from the two or more blockchain transactions deducts an amount from the piece of data, and wherein validating that the current value of the piece of data supports the blockchain transaction comprises validating that the current value of the piece of data is greater than or equal to the amount.

A fifth feature, combinable with any of the previous or following features, the operations further comprise: submitting the blockchain transaction for consensus sorting; and in response to validating that the current value of the piece of data is greater than or equal to the amount, executing the smart contract associated with the blockchain transaction to write the blockchain transaction to the blockchain.

A sixth feature, combinable with any of the previous or following features, specifies that validating that the current value of the piece of data is greater than or equal to the amount does not comprise validating that the current value of the piece of data is the same as a value of the piece of data indicated by the special instruction indicating the blockchain transaction.

A seventh feature, combinable with any of the previous or following features, specifies that executing the smart contract associated with the blockchain transaction to write the blockchain transaction to the blockchain comprises: generating a data block associated with the blockchain transaction; and publishing the data block to the blockchain.

An eighth feature, combinable with any of the previous or following features, specifies that for each blockchain transaction from the two or more blockchain transactions, pre-executing the smart contract associated with the blockchain transaction to generate the special instruction indicating the blockchain transaction comprises: performing a balance check on the piece of data; and if the balance check on the piece of data supports the blockchain transaction, generating the special instruction indicating the blockchain transaction.

A ninth feature, combinable with any of the previous or following features, specifies that the special instruction indicates that a comparison operation is to be performed on the piece of data when executing the smart contract.

In a third embodiment, an apparatus for avoiding double-spending problem in blockchain transactions, the apparatus comprising a plurality of modules for performing operations comprising: receiving instructions to execute two or more blockchain transactions on a piece of data, wherein all blockchain transactions of the two or more blockchain transactions modify a value of the piece of data; and for each blockchain transaction from the two or more blockchain transactions: pre-executing a smart contract associated with the blockchain transaction to generate a special instruction indicating the blockchain transaction, wherein the special instruction is used to validate that a current value of the piece of data supports the blockchain transaction when executing the smart contract to write the blockchain transaction to a blockchain. The foregoing and other described embodiments can each, optionally, include one or more of the following features:

A first feature, combinable with any of the following features, specifies that the two or more blockchain transactions are executed in parallel on the piece of data.

A second feature, combinable with any of the previous or following features, specifies that the blockchain is based on a read-write set model.

A third feature, combinable with any of the previous or following features, specifies that for each blockchain transaction from the two or more blockchain transactions, the special instruction, instead of a read-write set, is generated when pre-executing the smart contract associated with the blockchain transaction.

A fourth feature, combinable with any of the previous or following features, specifies that the blockchain transaction from the two or more blockchain transactions deducts an amount from the piece of data, and wherein validating that the current value of the piece of data supports the blockchain transaction comprises validating that the current value of the piece of data is greater than or equal to the amount.

A fifth feature, combinable with any of the previous or following features, the operations further comprise: submitting the blockchain transaction for consensus sorting; and in response to validating that the current value of the piece of data is greater than or equal to the amount, executing the smart contract associated with the blockchain transaction to write the blockchain transaction to the blockchain.

A sixth feature, combinable with any of the previous or following features, specifies that validating that the current value of the piece of data is greater than or equal to the amount does not comprise validating that the current value of the piece of data is the same as a value of the piece of data indicated by the special instruction indicating the blockchain transaction.

A seventh feature, combinable with any of the previous or following features, specifies that executing the smart contract associated with the blockchain transaction to write the blockchain transaction to the blockchain comprises: generating a data block associated with the blockchain transaction; and publishing the data block to the blockchain.

An eighth feature, combinable with any of the previous or following features, specifies that for each blockchain transaction from the two or more blockchain transactions, pre-executing the smart contract associated with the blockchain transaction to generate the special instruction indicating the blockchain transaction comprises: performing a balance check on the piece of data; and if the balance check on the piece of data supports the blockchain transaction, generating the special instruction indicating the blockchain transaction.

A ninth feature, combinable with any of the previous or following features, specifies that the special instruction indicates that a comparison operation is to be performed on the piece of data when executing the smart contract.

Embodiments of the subject matter and the actions and operations described in this specification can be implemented in digital electronic circuitry, in tangibly-embodied computer software or firmware, in computer hardware, including the structures disclosed in this specification and their structural equivalents, or in combinations of one or more of them. Embodiments of the subject matter described in this specification can be implemented as one or more computer programs, e.g., one or more modules of computer program instructions, encoded on a computer program carrier, for execution by, or to control the operation of, data processing apparatus. For example, a computer program carrier can include one or more computer-readable storage media that have instructions encoded or stored thereon. The carrier may be a tangible non-transitory computer-readable medium, such as a magnetic, magneto optical, or optical disk, a solid state drive, a random access memory (RAM), a read-only memory (ROM), or other types of media. Alternatively, or in addition, the carrier may be an artificially generated propagated signal, e.g., a machine-generated electrical, optical, or electromagnetic signal that is generated to encode information for transmission to suitable receiver apparatus for execution by a data processing apparatus. The computer storage medium can be or be part of a machine-readable storage device, a machine-readable storage substrate, a random or serial access memory device, or a combination of one or more of them. A computer storage medium is not a propagated signal.

A computer program, which may also be referred to or described as a program, software, a software application, an app, a module, a software module, an engine, a script, or code, can be written in any form of programming language, including compiled or interpreted languages, or declarative or procedural languages; and it can be deployed in any form, including as a stand-alone program or as a module, component, engine, subroutine, or other unit suitable for executing in a computing environment, which environment may include one or more computers interconnected by a data communication network in one or more locations.

A computer program may, but need not, correspond to a file in a file system. A computer program can be stored in a portion of a file that holds other programs or data, e.g., one or more scripts stored in a markup language document, in a single file dedicated to the program in question, or in multiple coordinated files, e.g., files that store one or more modules, sub programs, or portions of code.

Processors for execution of a computer program include, by way of example, both general- and special-purpose microprocessors, and any one or more processors of any kind of digital computer. Generally, a processor will receive the instructions of the computer program for execution as well as data from a non-transitory computer-readable medium coupled to the processor.

The term "data processing apparatus" encompasses all kinds of apparatuses, devices, and machines for processing data, including by way of example a programmable processor, a computer, or multiple processors or computers. Data processing apparatus can include special-purpose logic circuitry, e.g., an FPGA (field programmable gate array), an ASIC (application specific integrated circuit), or a GPU (graphics processing unit). The apparatus can also include, in addition to hardware, code that creates an execution environment for computer programs, e.g., code that constitutes processor firmware, a protocol stack, a database management system, an operating system, or a combination of one or more of them.

The processes and logic flows described in this specification can be performed by one or more computers or processors executing one or more computer programs to perform operations by operating on input data and generating output. The processes and logic flows can also be performed by special-purpose logic circuitry, e.g., an FPGA, an ASIC, or a GPU, or by a combination of special-purpose logic circuitry and one or more programmed computers.

Computers suitable for the execution of a computer program can be based on general or special-purpose microprocessors or both, or any other kind of central processing unit. Generally, a central processing unit will receive instructions and data from a read only memory or a random access memory or both. Elements of a computer can include a central processing unit for executing instructions and one or more memory devices for storing instructions and data. The central processing unit and the memory can be supplemented by, or incorporated in, special-purpose logic circuitry.

Generally, a computer will also include, or be operatively coupled to receive data from or transfer data to one or more storage devices. The storage devices can be, for example, magnetic, magneto optical, or optical disks, solid state drives, or any other type of non-transitory, computer-readable media. However, a computer need not have such devices. Thus, a computer may be coupled to one or more storage devices, such as, one or more memories, that are local and/or remote. For example, a computer can include one or more local memories that are integral components of the computer, or the computer can be coupled to one or more remote memories that are in a cloud network. Moreover, a computer can be embedded in another device, e.g., a mobile telephone, a personal digital assistant (PDA), a mobile audio or video player, a game console, a Global Positioning System (GPS) receiver, or a portable storage device, e.g., a universal serial bus (USB) flash drive, to name just a few.

Components can be "coupled to" each other by being commutatively such as electrically or optically connected to one another, either directly or via one or more intermediate components. Components can also be "coupled to" each other if one of the components is integrated into the other. For example, a storage component that is integrated into a processor (e.g., an L2 cache component) is "coupled to" the processor.

To provide for interaction with a user, embodiments of the subject matter described in this specification can be implemented on, or configured to communicate with, a computer having a display device, e.g., a LCD (liquid crystal display) monitor, for displaying information to the user, and an input device by which the user can provide input to the computer, e.g., a keyboard and a pointing device, e.g., a mouse, a trackball or touchpad. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's device in response to requests received from the web browser, or by interacting with an app running on a user device, e.g., a smartphone or electronic tablet. Also, a computer can interact with a user by sending text messages or other forms of message to a personal device, e.g., a smartphone that is running a messaging application, and receiving responsive messages from the user in return.

This specification uses the term "configured to" in connection with systems, apparatus, and computer program components. For a system of one or more computers to be configured to perform particular operations or actions means that the system has installed on it software, firmware, hardware, or a combination of them that in operation cause the system to perform the operations or actions. For one or more computer programs to be configured to perform particular operations or actions means that the one or more programs include instructions that, when executed by data processing apparatus, cause the apparatus to perform the operations or actions. For special-purpose logic circuitry to be configured to perform particular operations or actions means that the circuitry has electronic logic that performs the operations or actions.

While this specification contains many specific embodiment details, these should not be construed as limitations on the scope of what is being claimed, which is defined by the claims themselves, but rather as descriptions of features that may be specific to particular embodiments. Certain features that are described in this specification in the context of separate embodiments can also be realized in combination in a single embodiment. Conversely, various features that are described in the context of a single embodiments can also be realized in multiple embodiments separately or in any suitable subcombination. Moreover, although features may be described above as acting in certain combinations and even initially be claimed as such, one or more features from a claimed combination can in some cases be excised from the combination, and the claim may be directed to a subcombination or variation of a subcombination.

Similarly, while operations are depicted in the drawings and recited in the claims in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system modules and components in the embodiments described above should not be understood as requiring such separation in all embodiments, and it should be understood that the described program components and systems can generally be integrated together in a single software product or packaged into multiple software products.

Particular embodiments of the subject matter have been described. Other embodiments are within the scope of the following claims. For example, the actions recited in the claims can be performed in a different order and still achieve desirable results. As one example, the processes depicted in the accompanying figures do not necessarily require the particular order shown, or sequential order, to achieve desirable results. In some cases, multitasking and parallel processing may be advantageous.

What is claimed is:

1. A computer-implemented method for avoiding double-spending in blockchain transactions of a read-write set-model-based blockchain, the method comprising:
receiving, by a computing system, instructions to execute a plurality of parallel blockchain transactions that are based on a read-write set-model in which a read-write set that indicates a remaining account balance of an associated account for each blockchain transaction is included in the blockchain transaction;
for each blockchain transaction of the plurality of parallel blockchain transactions,
  (i) pre-executing, by the computing system, a smart contract associated with the blockchain transaction and performing a logical verification on the blockchain transaction that initially validates that a balance of an account of a user is greater than or equal to a spending amount of blockchain assets being deducted from the balance of the account of the user by the blockchain transaction, wherein pre-executing the smart contract comprises,
    generating, by the computing system, an instruction to change the balance of the account of the user in response to the blockchain transaction, wherein the instruction indicates a current balance of the account of the user and the spending amount of blockchain assets being deducted from the balance of the account of the user rather than an associated read-write set that indicates the current balance of the account of the user and a remaining account balance of the user after the spending amount of blockchain assets are deducted from the account of the user, and
  (ii) performing, by the computing system, consensus sorting on the blockchain transaction and the instruction to change the balance of the account;
performing, by the computing system, data storage verification on the plurality of parallel blockchain transactions and the instruction generated for each blockchain transaction of the plurality of parallel blockchain transactions, wherein performing data storage verification comprises,
  determining, by the computing system, that the balance of the account of the user is greater than or equal to the spending amount in the instruction generated for a first blockchain transaction of the plurality of parallel blockchain transactions,
  modifying, by the computing system, the balance of the account of the user according to the instruction generated for the first blockchain transaction, and
  determining, by the computing system, whether the balance of the account of the user is greater than or equal to the spending amount in the instruction generated for a second blockchain transaction of the plurality of parallel blockchain transactions; and
forwarding, by the computing system, the first blockchain transaction to at least one further computing system acting as a consensus node.

2. A non-transitory, computer-readable storage medium storing one or more instructions that, when executed by a computer system, causes the computer system to perform operations for avoiding double-spending in blockchain transactions of a read-write set-model-based blockchain, comprising:
receiving, by the computing system, instructions to execute a plurality of parallel blockchain transactions that are based on a read-write set-model in which a read-write set that indicates a remaining account balance of an associated account for each blockchain transaction is included in the blockchain transaction;
for each blockchain transaction of the plurality of parallel blockchain transactions,
  (i) pre-executing, by the computing system, a smart contract associated with the blockchain transaction and performing a logical verification on the blockchain transaction that initially validates that a balance of an account of a user is greater than or equal to a spending amount of blockchain assets being deducted from the balance of the account of the user by the blockchain transaction, wherein pre-executing the smart contract comprises
    generating, by the computing system, an instruction to change the balance of the account of the user in response to the blockchain transaction, wherein the instruction indicates a current balance of the account of the user and the spending amount of blockchain assets being deducted from the balance of the account of the user rather than an associated read-write set that indicates the current balance of the account of the user and a remaining account balance of the user after the spending amount of blockchain assets are deducted from the account of the user, and
  (ii) performing, by the computing system, consensus sorting on the blockchain transaction and the instruction to change the balance of the account;
performing, by the computing system, data storage verification on the plurality of parallel blockchain transactions and the instruction generated for each blockchain transaction of the plurality of parallel blockchain transactions, wherein performing data storage verification comprises,
  determining, by the computing system, that the balance of the account of the user is greater than or equal to the spending amount in the instruction generated for a first blockchain transaction of the plurality of parallel blockchain transactions,
  modifying, by the computing system, the balance of the account of the user according to the instruction generated for the first blockchain transaction, and
  determining, by the computing system, whether the balance of the account of the user is greater than or equal to the spending amount in the instruction generated for a second blockchain transaction of the plurality of parallel blockchain transactions; and forwarding, by the computing system, the first blockchain transaction to at least one further computing system acting as a consensus node.

3. A computer-implemented system, comprising:
a computing system comprising one or more computers; and
one or more computer memory devices interoperably coupled with the one or more computers and having tangible, non-transitory, machine-readable media storing one or more instructions that, when executed by the one or more computers, perform one or more operations for avoiding double-spending in blockchain transactions of a read-write set-model-based blockchain, comprising:
receiving, by the computing system, instructions to execute a plurality of parallel blockchain transactions that are based on a read-write set-model in which a read-write set that indicates a remaining account balance of an associated account for each blockchain transaction is included in the blockchain transaction;
for each blockchain transaction of the plurality of parallel blockchain transactions,
(i) pre-executing, by the computing system, a smart contract associated with the blockchain transaction and performing a logical verification on the blockchain transaction that initially validates that a balance of an account of a user is greater than or equal to a spending amount of blockchain assets being deducted from the balance of the account of the user by the blockchain transaction, wherein pre-executing the smart contract comprises,
generating, by the computing system, an instruction to change the balance of the account of the user in response to the blockchain transaction, wherein the instruction indicates a current balance of the account of the user and the spending amount of blockchain assets being deducted from the balance of the account of the user rather than an associated read-write set that indicates the current balance of the account of the user and a remaining account balance of the user after the spending amount of blockchain assets are deducted from the account of the user, and
(ii) performing, by the computing system, consensus sorting on the blockchain transaction and the instruction to change the balance of the account;
performing, by the computing system, data storage verification on the plurality of parallel blockchain transactions and the instruction generated for each blockchain transaction of the plurality of parallel blockchain transaction, wherein performing data storage verification comprises,
determining, by the computing system, that the balance of the account of the user is greater than or equal to the spending amount in the instruction generated for a first blockchain transaction of the plurality of parallel blockchain transactions,
modifying, by the computing system, the balance of the account of the user according to the instruction generated for the first blockchain transaction, and
determining, by the computing system, whether the balance of the account of the user is greater than or equal to the spending amount in a second instruction generated for a second blockchain transaction of the plurality of parallel blockchain transactions; and
forwarding, by the computing system, the first blockchain transaction to at least one further computing system acting as a consensus node.

4. The computer-implemented method of claim 1, further comprising:
receiving, by the computing system, an additional instruction to execute an additional blockchain transaction for transferring a particular amount of blockchain assets from an additional account of an additional user;
determining, by the computing system, that the additional account of the additional user has no concurrent transactions;
selecting, by the computing system and from among multiple data verification processes, a second data verification process for the additional blockchain transaction based on the additional account of the additional user having no concurrent transactions;
pre-executing, by the computing system, an additional smart contract associated with the additional blockchain transaction and performing an additional logical verification on the additional blockchain transaction that initially validates that an additional balance of the additional account of the additional user is greater than or equal to the particular amount of blockchain assets being transferred from the additional account of the additional user by the additional blockchain transaction;
in response to determining that the additional account of the additional user has no concurrent transactions, including, by the computing system in the additional smart contract, a read-write set that indicates an initial balance of the additional account of the additional user and a subsequent balance of the additional account of the additional user after the particular amount of blockchain assets is transferred from the additional account of the additional user; and
transmitting, by the computing system, the smart contract with the read-write set to one or more data verification computers.

5. The non-transitory, computer-readable storage medium of claim 2, wherein the operations comprise:
receiving an additional instruction to execute an additional blockchain transaction for transferring a particular amount of blockchain assets from an additional account of an additional user;
determining that the additional account of the additional user has no concurrent transactions;
selecting, from among multiple data verification processes, a second data verification process for the additional blockchain transaction based on the additional account of the additional user having no concurrent transactions;
pre-executing an additional smart contract associated with the additional blockchain transaction and performing an additional logical verification on the additional blockchain transaction that initially validates that an additional balance of the additional account of the additional user is greater than or equal to the particular amount of blockchain assets being transferred from the additional account of the additional user by the additional blockchain transaction;
in response to determining that the additional account of the additional user has no concurrent transactions, including, in the additional smart contract, a read-write set that indicates an initial balance of the additional account of the additional user and a subsequent balance of the additional account of the additional user after the particular amount of blockchain assets is transferred from the additional account of the additional user; and transmitting the smart contract with the read-write set to one or more data verification computers.

6. The computer-implemented system of claim 3, wherein the operations comprise:

receiving an additional instruction to execute an additional blockchain transaction for transferring a particular amount of blockchain assets from an additional account of an additional user;

determining that the additional account of the additional user has no concurrent transactions;

selecting, from among multiple data verification processes, a second data verification process for the additional blockchain transaction based on the additional account of the additional user having no concurrent transactions;

pre-executing an additional smart contract associated with the additional blockchain transaction and performing an additional logical verification on the additional blockchain transaction that initially validates that an additional balance of the additional account of the additional user is greater than or equal to the particular amount of blockchain assets being transferred from the additional account of the additional user by the additional blockchain transaction;

in response to determining that the additional account of the additional user has no concurrent transactions, including, in the additional smart contract, a read-write set that indicates an initial balance of the additional account of the additional user and a subsequent balance of the additional account of the additional user after the particular amount of blockchain assets is transferred from the additional account of the additional user; and transmitting the smart contract with the read-write set to one or more data verification computers.

7. The computer-implemented method of claim 1, wherein performing data storage verification further comprises:

determining, by the computing system, that the balance of the account of the user is greater than or equal to the spending amount in the instruction generated for the second blockchain transaction of the plurality of parallel blockchain transactions; and, modifying, by the computing system, the balance of the account of the user according to the instruction generated for the second blockchain transaction.

8. The non-transitory, computer-readable storage medium of claim 2, wherein performing data storage verification further comprises:

determining, by the computing system, that the balance of the account of the user is greater than or equal to the spending amount in the instruction generated for the second blockchain transaction of the plurality of parallel blockchain transactions; and, modifying, by the computing system, the balance of the account of the user according to the instruction generated for the second blockchain transaction.

9. The computer-implemented system of claim 3, wherein performing data storage verification further comprises:

determining, by the computing system, that the balance of the account of the user is greater than or equal to the spending amount in the instruction generated for the second blockchain transaction of the plurality of parallel blockchain transactions; and, modifying, by the computing system, the balance of the account of the user according to the instruction generated for the second blockchain transaction.

10. The computer-implemented method of claim 1, wherein determining, by the computing system, that the balance of the account of the user is greater than or equal to the spending amount in the instruction generated for a first blockchain transaction of the plurality of parallel blockchain transactions comprises comparing a current balance of the account of the user to the spending amount in the instruction generated for a first blockchain transaction rather than comparing the current balance of the account to an account balance specified by an associated read-write set corresponding to the first blockchain transaction.

11. The non-transitory, computer-readable storage medium of claim 2, wherein determining, by the computing system, that the balance of the account of the user is greater than or equal to the spending amount in the instruction generated for a first blockchain transaction of the plurality of parallel blockchain transactions comprises comparing a current balance of the account of the user to the spending amount in the instruction generated for a first blockchain transaction rather than comparing the current balance of the account to an account balance specified by an associated read-write set corresponding to the first blockchain transaction.

12. The computer-implemented system of claim 3, wherein determining, by the computing system, that the balance of the account of the user is greater than or equal to the spending amount in the instruction generated for a first blockchain transaction of the plurality of parallel blockchain transactions comprises comparing a current balance of the account of the user to the spending amount in the instruction generated for a first blockchain transaction rather than comparing the current balance of the account to an account balance specified by an associated read-write set corresponding to the first blockchain transaction.

* * * * *